(12) United States Patent
Menheere et al.

(10) Patent No.: US 10,508,599 B2
(45) Date of Patent: Dec. 17, 2019

(54) GAS TURBINE ENGINE EXHAUST SYSTEM

(71) Applicant: PRATT & WHITNEY CANADA CORP., Longueuil (CA)

(72) Inventors: David H Menheere, Norval (CA); Adam Trumpour, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 636 days.

(21) Appl. No.: 15/255,444

(22) Filed: Sep. 2, 2016

(65) Prior Publication Data

US 2018/0066583 A1 Mar. 8, 2018

(51) Int. Cl.
| F02C 1/00 | (2006.01) |
| F02C 7/18 | (2006.01) |
| F02C 3/04 | (2006.01) |
| F02C 7/10 | (2006.01) |

(52) U.S. Cl.
CPC ............... F02C 7/18 (2013.01); F02C 3/04 (2013.01); F02C 7/10 (2013.01)

(58) Field of Classification Search
CPC ...... F02C 7/18; F02C 7/10; F02C 3/34; F02C 9/18; F02C 6/08; F02C 1/06; F05D 2260/213; F28D 21/0003

See application file for complete search history.

(56) References Cited

U.S. PATENT DOCUMENTS

| 4,333,309 | A | 6/1982 | Coronel | |
| 4,607,487 | A | 8/1986 | Tilston | |
| 7,431,125 | B2 | 10/2008 | Williams | |
| 2005/0235627 | A1* | 10/2005 | Vandermolen | F02C 7/08 60/39.511 |
| 2010/0251702 | A1* | 10/2010 | Shikazono | F01N 5/02 60/320 |

* cited by examiner

*Primary Examiner* — Craig Kim
*Assistant Examiner* — Edwin Kang
(74) *Attorney, Agent, or Firm* — Norton Rose Fulbright Canada L.L.P.

(57) ABSTRACT

An exhaust system for a gas turbine engine, such as an APU, comprises a pressure vessel having an annular wall circumscribing an exhaust plenum. The annular wall is composed of an arrangement of individual tubes assembled side-by-side around a central axis of the exhaust plenum. The tubes are fed with pressurized cooling air, such as P3 air. A heat exchanger in heat transfer relationship with the exhaust gases flowing through the exhaust plenum receives air from the tubes. The heat transferred from the exhaust gases to the air circulated through the heat exchanger may be used to provide pre-heated air to the engine combustor.

13 Claims, 5 Drawing Sheets

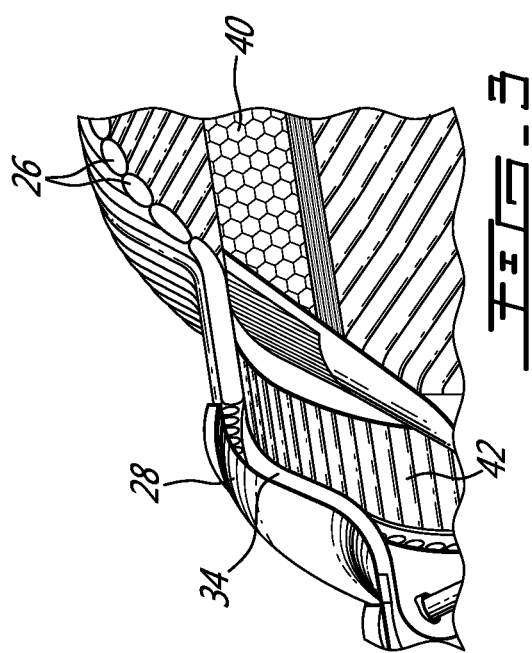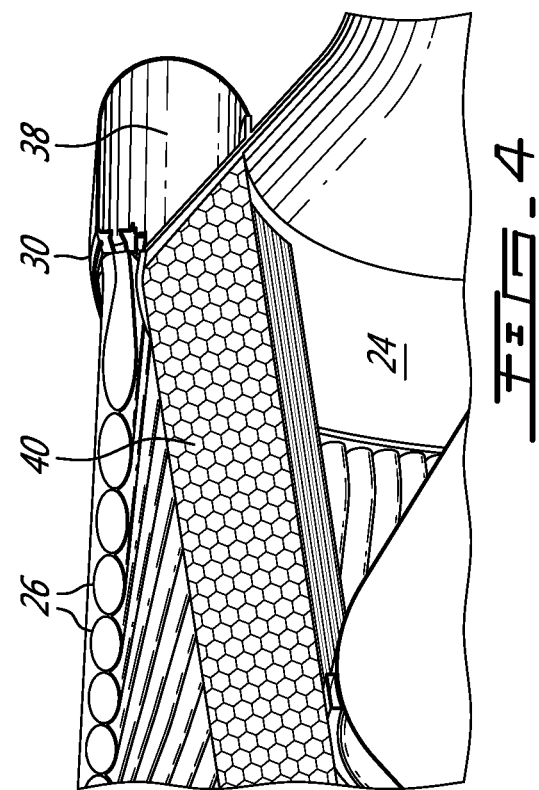

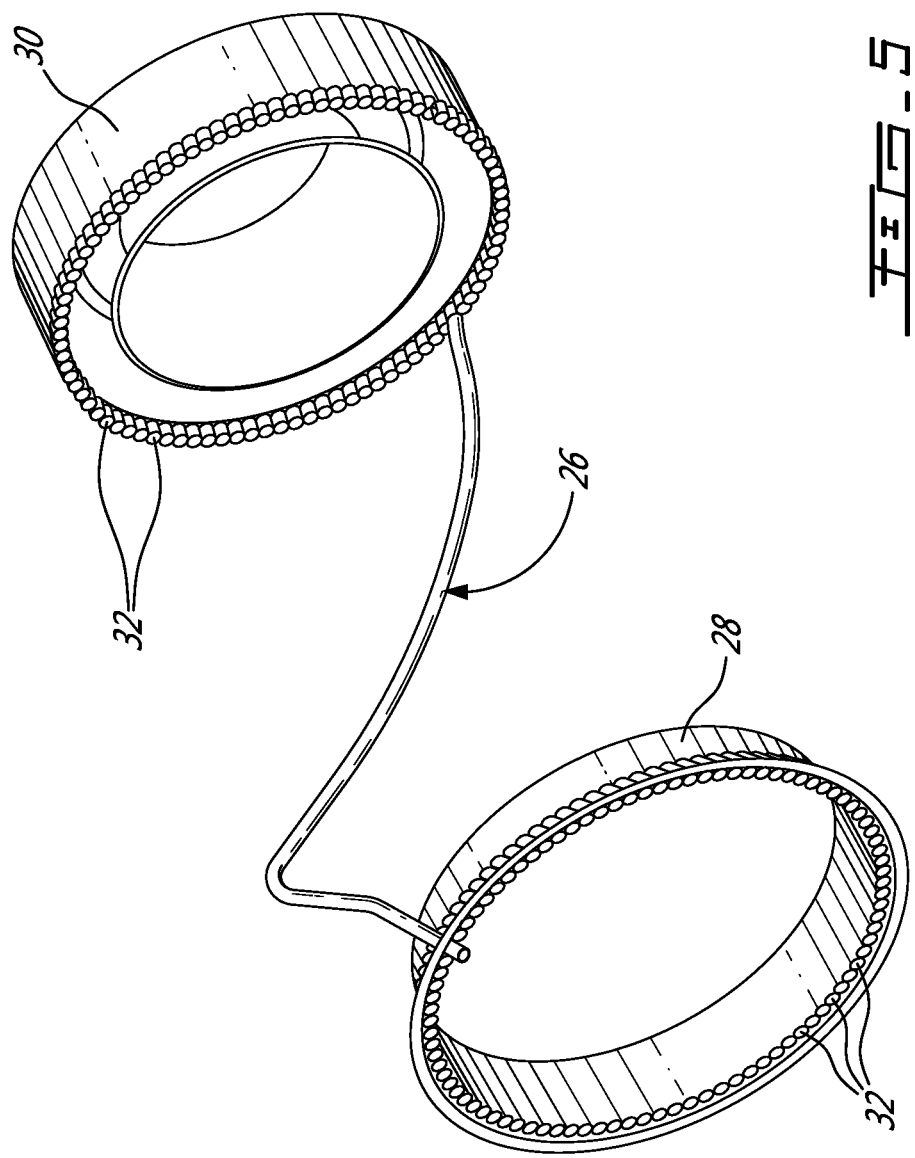

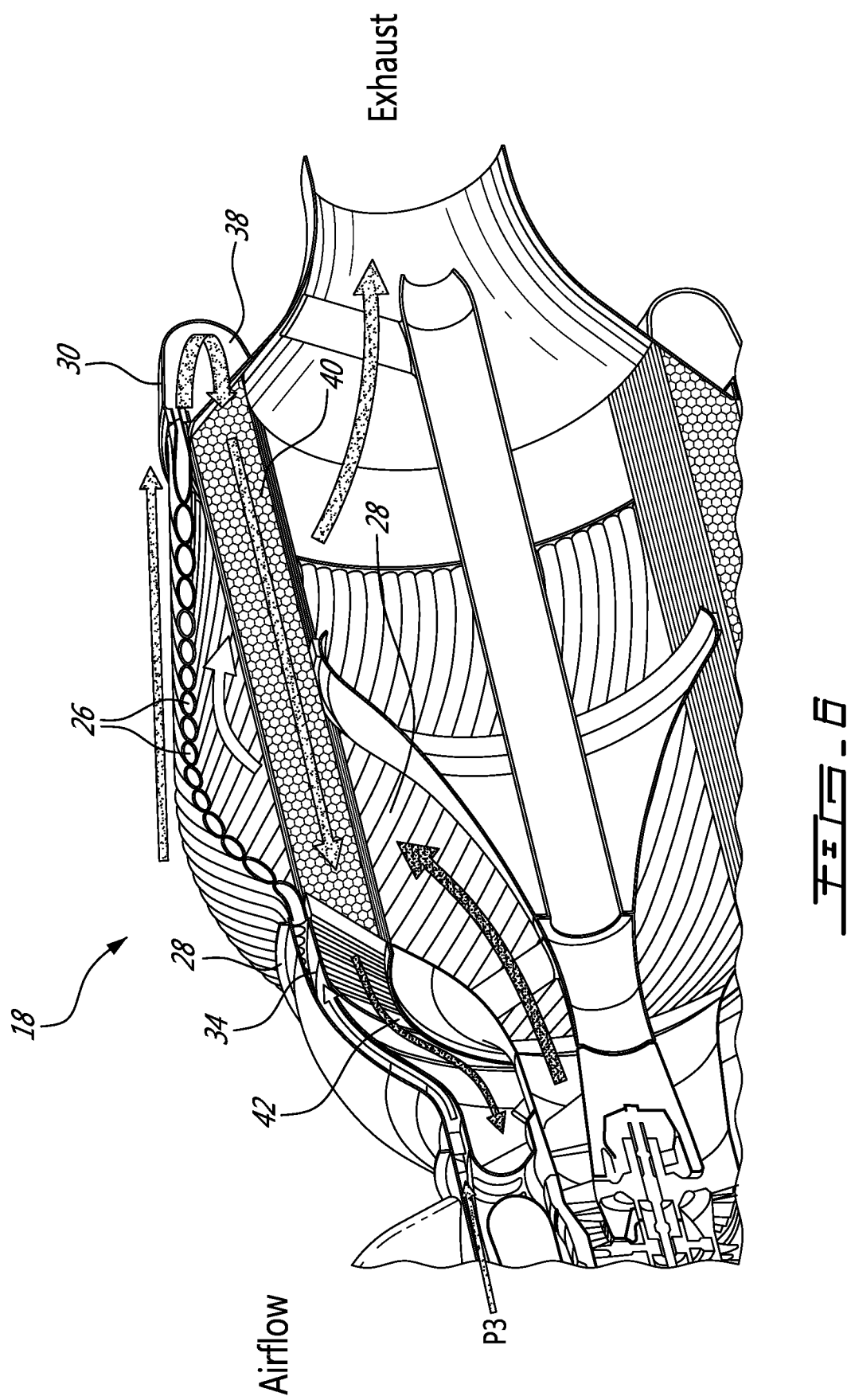

GAS TURBINE ENGINE EXHAUST SYSTEM

TECHNICAL FIELD

The application relates generally to gas turbine engines and, more particularly, to an exhaust system.

BACKGROUND OF THE ART

Existing approaches to forming a thermal barrier on an exhaust duct of a gas turbine engine, such as an auxiliary power unit (APU), typically involve multiple levels of sandwich material with air spacing around the exhaust duct wall. The use of multiple layers of material increase weight and cost. Any high temperature areas exposed must be covered, which sometimes requires the use of extra thermal blankets which are bulky and expensive.

There is thus a need for a new thermal shield arrangement.

SUMMARY

In one aspect, there is provided an exhaust system for a gas turbine engine, comprising a pressure vessel having an annular wall circumscribing an exhaust plenum for evacuating exhaust gases from the engine, at least part of the annular wall provided by a plurality of tubes disposed side-by-side adjacent one another, the tubes being exposed on a first side to the exhaust gases in the exhaust plenum and on a second side to gases outside the pressure vessel, a source of cooling air in fluid flow communication with an inlet end of the tubes, and a heat exchanger positioned in the exhaust plenum and in fluid flow communication with an outlet end of the tubes.

In another aspect, there is provided an auxiliary power unit (APU) comprising: a compressor for pressurizing incoming air, a combustor in which air compressed by the compressor is mixed with fuel and ignited for generating a stream of combustion gases, a turbine for extracting energy from the combustion gases, and an exhaust system downstream of the turbine for evacuating the combustion gases, the exhaust system comprising a pressure vessel having an annular wall circumscribing an exhaust plenum, the annular wall comprising a circumferential array of individual tubes circumferentially stacked one against each other around a central axis of the exhaust plenum, the tubes being fluidly link to the compressor, and a heat exchanger mounted inside the pressure vessel, the heat exchanger having an inlet connected in fluid flow communication with the tubes and an outlet connected in fluid flow communication with a plenum surrounding the combustor.

In a further aspect, there is provided a method for thermally shielding an exhaust section of a gas turbine engine, comprising circumferentially stacking a plurality of tubes one against each other to form a continuous annular wall defining an exhaust plenum configured to contain exhaust gases to be evacuated from the engine, and connecting the tubes to a source of coolant.

DESCRIPTION OF THE DRAWINGS

Reference is now made to the accompanying figures in which:

FIG. 3 is an enlarged cross-section view of an upstream end portion of an exhaust system of the APU;

FIG. 4 is an enlarged cross-section view of a downstream end portion of the exhaust system;

FIG. 5 is an isometric view illustrating construction details of the exhaust system; and FIG. 6 is an isometric cross-section view illustrating the gas and air flow paths through the exhaust system.

DETAILED DESCRIPTION

Figure 1:
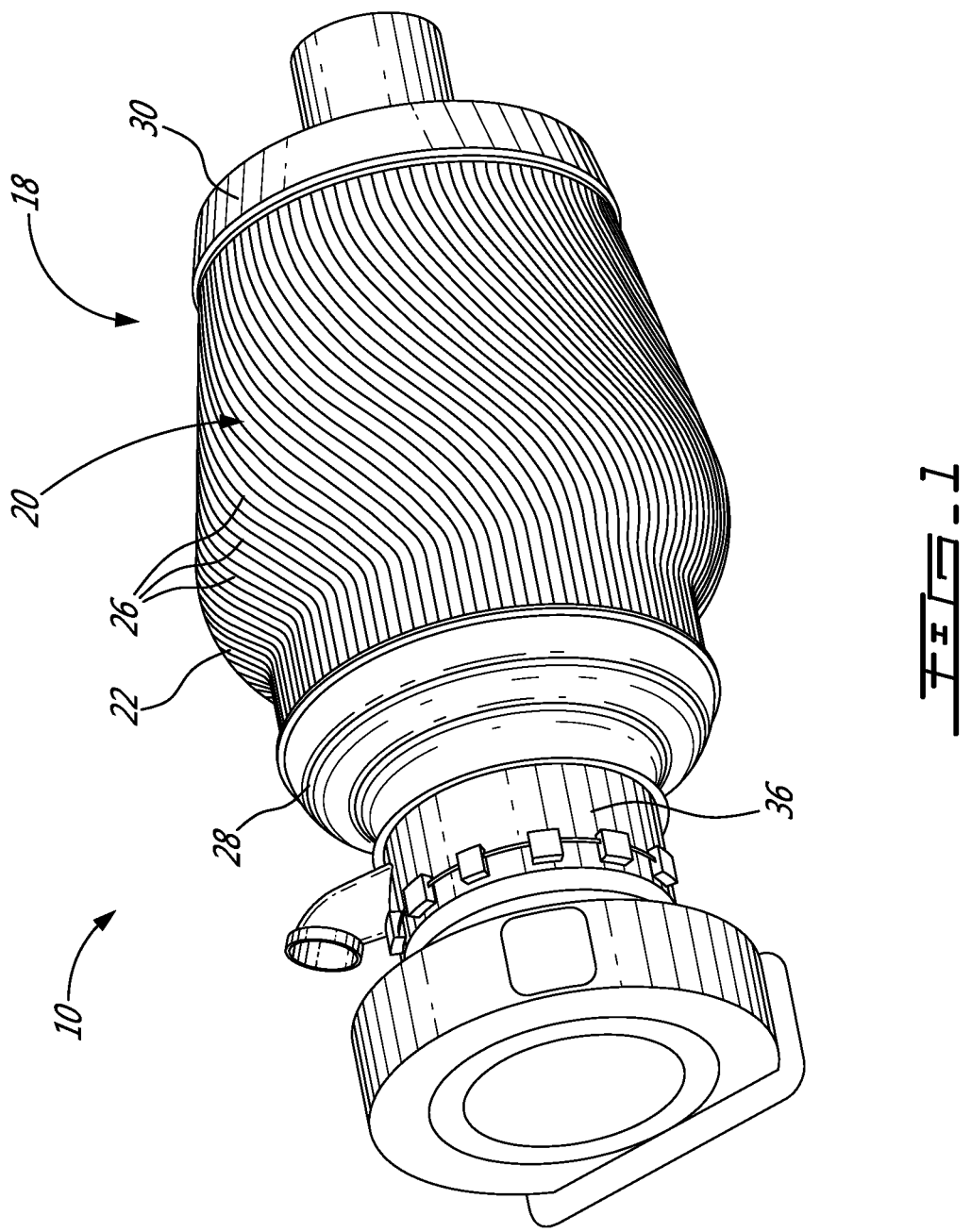
FIG. 1 is an isometric view of an airborne auxiliary power unit (APU)
Figure 2:
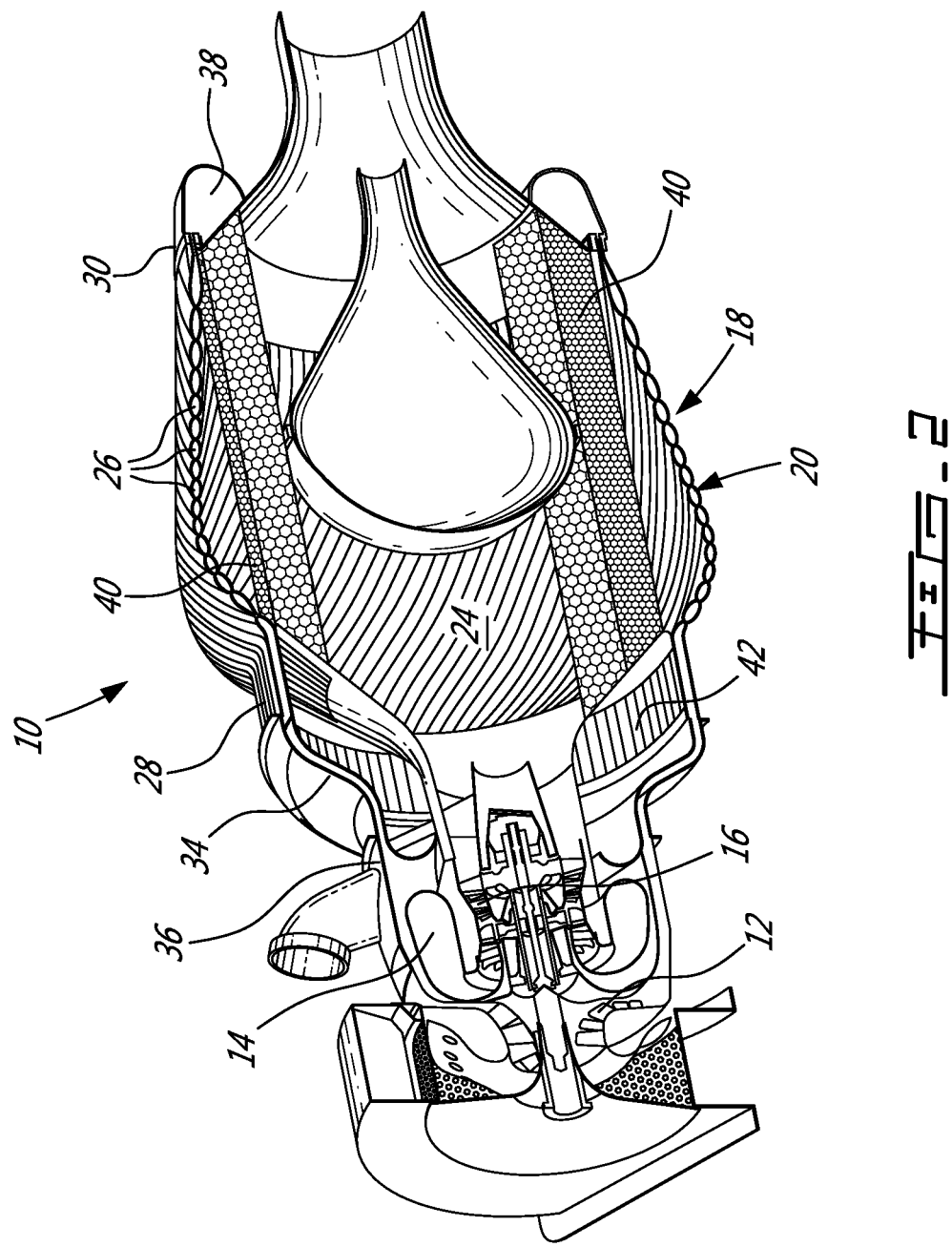
FIG. 2 is a cross-section of the APU shown in FIG. 1.

FIGS. 1 and 2 illustrate a gas turbine engine 10 and, more particularly, an auxiliary power unit (APU) suitable for providing electrical and pneumatic power to various parts of an aircraft. The APU generally comprises in serial flow communication a compressor 12 for pressurizing the air, a combustor 14 in which the compressed air is mixed with fuel and ignited for generating an annular stream of hot combustion gases, and a turbine 16 for extracting energy from the combustion gases.

As shown in FIGS. 1 and 2, the APU further comprises an exhaust system 18 downstream from the turbine 16. The exhaust system 18 comprises an exterior case in the form of a pressure vessel 20 having an annular wall 22 circumscribing an exhaust plenum 24 through which the exhaust gases are channelled before being evacuated from the engine.

The annular wall 22 of the pressure vessel 20 is at least partly composed of a mechanical arrangement of individual tubes 26 (100 tubes in the illustrated example) assembled side-by-side around a central axis of the exhaust plenum 24. According to the illustrated example, the tubes 26 are circumferentially stacked one against the other so as to jointly form a continuous annular wall around a full circumference of the exhaust plenum 24. As will be seen hereinafter, a coolant, such as cooling air, may be circulated through the tubes 26 to form a thermal shield around the exhaust plenum 24, thereby eliminating or reducing the need for additional thermal barrier lining in the exhaust section of the engine 10.

As best shown in FIG. 5, each individual tube 26 extends axially between an upstream end cap 28 and a downstream end cap 30. According to the illustrated embodiment, the upstream and downstream end caps 28, 30 are annular and each comprise a circumferential array of tube seats 32 for receiving respective ends of the tubes 26. Once assembled with the end caps 28, 30, the tubes 26 are suitably joined as an assembly to form a one piece structure. For instance, the tubes 26 may be brazed to one another and to the end caps 28, 30 so as to form a continuous annular wall for containing the exhaust gases flowing from the turbine 16.

Still referring to FIG. 5, it can be appreciated that the tubes 26 may be bent along the length thereof and attached to diametrically opposed or angularly offset portions of the end caps 28, 30 to vary the diameter of the exhaust plenum 24 along the axial length thereof. The forming of the tubes to create the exhaust plenum 24 relies on the specific angle of the tubes 26 to create varying diameter when stacked together. The larger the angle of the tubes 26 the larger the cross-sectional distance and therefore the larger the diameter of the resulting structure. By varying the tube angle, as shown in FIG. 5, a structure of various diameters can be created without changing the diameter of the individual tubes 26. It is understood that various tube routing arrangements could be adopted, including straight tubes arrangements.

According to the illustrated embodiments, the tubes 26 have identical or similar dimensions. However, it is understood that the tubes 26 could have different lengths, diameters and wall thicknesses. Because the wall 22 of the pressure vessel 20 is formed from tubes 26, the pressure vessel wall 22 can be thin and still support high pressure coolant (e.g. P3 air derived from the compressor 12). For instance, for P3 air, steel or aluminum tubes having a very-thin wall (0.005"-0.010") can be used to form the wall of the pressure vessel 20. The tube construction can, thus, contribute to minimize the weight of the exhaust section of the engine 10.

Referring conjointly to FIGS. 2, 3 and 6, it can be appreciated that the upstream ends of the tubes 26 may be in fluid flow communication with a first annular plenum 34 for receiving P3 air from the compressor 12 via the gas generator case 36 of the engine. Now turning to FIG. 4, it can be appreciated that the downstream ends of the tubes 26 are connected in fluid flow communication with a second annular plenum 38 defined in the downstream end cap 30. As shown in FIGS. 2 and 4, the second plenum 38 may be connected in fluid flow communication to a heat exchanger 40 mounted within the exhaust plenum 24 for extracting heat from the combustion gases. As shown in FIG. 2, the heat exchanger 40 can comprise two axially extending units, one at the top of the exhaust plenum 24 and one at the bottom thereof. The heat exchanger 40 is connected at a downstream end thereof to a third annular plenum 42 for directing pre-heated air into the combustor 14. The heat exchanger 40, thus, acts as a recuperator for cooling the exhaust gases and providing pre-heated air to the combustor 14.

In operation, compressor bleed air, such as P3 air, is bled from the compressor 12 and directed through the first annular plenum 34. As shown in FIG. 6, the cooling air then flows from the first plenum 34 through the tubes 26 composing the wall 22 of the pressure plenum 20. The resulting cooling air filled tubes 26 form a thermal barrier or shield separating the hot exhaust flow from the surrounding structure, thereby reducing or eliminating the need for additional thermal shielding. Indeed, according to some applications, the air filled tube arrangement can provide for a maximum touch temperature on an APU installation, which is below or close to the 450° F. limit as imposed by the Airframer ECS bleed requirements. One effect of using this type of thermal barrier on a typical APU installation is to provide a clean cosmetic exterior which meets or approaches the maximum temperature limitation while providing for a relatively lightweight exhaust duct arrangement. As the air flows through the tubes 26, it picks up heat from the exhaust gases flowing through the exhaust plenum 24. The arrangement of tubes thus also functions as a "preliminary" heat exchanger" to increase thermal transfer to the cooling air from the hot exhaust, thereby raising the efficiency of the downstream recuperator installation, which, in turn, may contribute to reduce specific fuel consumption (SFC). The cooling air is circulated from the tubes 26 through the heat exchanger 40 via the second plenum 38. As the air travels through the heat exchanger 40 additional heat is extracted from the exhaust gases. The heated air is then directed into the plenum surrounding the combustor 14 to provide pre-heated air to the combustor 14.

From the foregoing, it can be appreciated that the cooling air filled tubes (e.g. the P3 air filled tubes) forms a relatively cool structure (e.g. an insulating blanket) around the exhaust plenum 24 while transferring cooling air (e.g. P3 air) to the recuperator and absorbing heat and increasing the system efficiency. The traditional method of feeding the recuperator would be via external transfer tubes carrying the P3 air to the rear section of the recuperator through a manifold. The hot exhaust sections would be exposed and would require thermal blankets which would result in increased cost and weight. By using the tubes to form the wall of the pressure vessel, the need for external transfer tubes is eliminated. Using the same tubes for both cooling the pressure vessel and feeding the recuperator allows to eliminate several parts (thick thermal heat shield, external transfer tubes, recuperator outer skin etc.). This may result in weight and cost reductions.

The exhaust system 20, including the pressure vessel and the recuperator, may also be configured to provide noise reduction. A noise attenuation treatment could be applied to a portion of the exhaust system.

The above description is meant to be exemplary only, and one skilled in the art will recognize that changes may be made to the embodiments described without departing from the scope of the invention disclosed. For example, while the illustrated embodiment is for an APU installation, it is understood that the principles of the present invention could be applied to the exhaust section of other types of gas turbine engines, such as turboprops equipped with recuperators. Also, the tubes could be connected in serial flow communications between plenums 34 and 38. Still other modifications which fall within the scope of the present invention will be apparent to those skilled in the art, in light of a review of this disclosure, and such modifications are intended to fall within the appended claims.

The invention claimed is:

1. An exhaust system for a gas turbine engine, comprising a pressure vessel having an annular wall circumscribing an exhaust plenum for evacuating exhaust gases from the gas turbine engine, the annular wall including a circumferential array of tubes extending longitudinally along a central axis of the pressure vessel, adjacent ones of the tubes being sealed to one another along a longitudinal direction of the tubes to collectively form a longitudinally extending surface along a full circumference of the annular wall of the pressure vessel, the tubes being exposed on a first side to the exhaust gases in the exhaust plenum and on a second side to gases outside the pressure vessel, a source of cooling air in fluid flow communication with an inlet end of the tubes at a first upstream longitudinal end of the pressure vessel, and a heat exchanger positioned in the exhaust plenum and in fluid flow communication with an outlet end of the tubes at a second downstream longitudinal end of the pressure vessel.

2. The exhaust system defined in claim 1, wherein the pressure vessel further comprises upstream and downstream end caps, the inlet and outlet ends of the tubes being respectively mounted to the upstream and downstream end caps.

3. The exhaust system defined in claim 2, wherein the inlet end of a first one of the tubes is mounted to the upstream end cap at a circumferential location on the upstream cap which is angularly offset with respect to a location where the outlet end of the first one of the tubes is mounted to the downstream end cap.

4. The exhaust system defined in claim 1, wherein the tubes are bent along a length of the tubes to create varying diameters along the longitudinal direction of the exhaust plenum.

5. The exhaust system defined in claim 1, wherein the tubes forms an inner skin of the pressure vessel.

6. The exhaust system defined in claim 1, wherein the tubes are arranged in a circular pattern and brazed to one another as a unitary unit with inlet and outlet plenums at the inlet end and the outlet end, respectively, of the tubes.

7. The exhaust system defined in claim 1, wherein the heat exchanger has an outlet connected in flow communication with a combustor plenum surrounding a combustor of the gas turbine engine.

8. An auxiliary power unit (APU) comprising: a compressor for pressurizing incoming air, a combustor in which the air compressed by the compressor is mixed with fuel and ignited for generating a stream of combustion gases, a turbine for extracting energy from the combustion gases, and an exhaust system downstream of the turbine for evacuating the combustion gases, the exhaust system comprising a pressure vessel having an annular wall circumscribing an exhaust plenum, the annular wall comprising a circumferential array of individual tubes assembled side-by-side around a central axis of the exhaust plenum and extending longitudinally along the central axis between an inlet end provided at an upstream end of the pressure vessel and an outlet end provided at a downstream end of the pressure vessel, the inlet end of the tubes being fluidly linked to the compressor, and a heat exchanger mounted inside the pressure vessel, the heat exchanger having an inlet connected in fluid flow communication with the outlet end of the tubes and an outlet connected in fluid flow communication with a combustor plenum surrounding the combustor.

9. APU defined in claim 8, wherein the tubes forms an inner skin of the annular wall of the pressure vessel.

10. The APU defined in claim 8, wherein the tubes jointly form a continuous annular surface around the central axis of the exhaust plenum.

11. The APU defined in claim 8, wherein the tubes are bent along a length of the tubes.

12. The APU defined in claim 8, wherein the inlet end and outlet end of each of the tubes are circumferentially offset with respect to one another.

13. The APU defined in claim 8, wherein the tubes are assembled at the inlet end and outlet end to an inlet end cap and an outlet end cap, respectively, having annular rows of seats for receiving the tubes.

\* \* \* \* \*